US012610368B2

(12) United States Patent
Kou et al.

(10) Patent No.: US 12,610,368 B2
(45) Date of Patent: Apr. 21, 2026

(54) SYSTEM AND METHOD FOR SIGNAL TRANSMISSION

(71) Applicant: ZTE CORPORATION, Shenzhen (CN)

(72) Inventors: Shuaihua Kou, Shenzhen (CN); Peng Hao, Shenzhen (CN); Xing Liu, Shenzhen (CN); Wei Gou, Shenzhen (CN); Xingguang Wei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 345 days.

(21) Appl. No.: 18/157,315

(22) Filed: Jan. 20, 2023

(65) Prior Publication Data

US 2023/0180244 A1 Jun. 8, 2023

Related U.S. Application Data

(63) Continuation of application No. PCT/CN2020/106067, filed on Jul. 31, 2020.

(51) Int. Cl.
*H04W 72/21* (2023.01)
*H04W 72/30* (2023.01)

(52) U.S. Cl.
CPC ........... *H04W 72/21* (2023.01); *H04W 72/30* (2023.01)

(58) Field of Classification Search
CPC .................. H04W 72/21; H04W 72/30; H04L 2001/0093; H04L 1/1854
USPC ................................ 370/310, 316, 319, 321
See application file for complete search history.

(56) References Cited

U.S. PATENT DOCUMENTS

| | | |
|---|---|---|
| 9,369,256 B2 | 6/2016 | Seo et al. |
| 2016/0270066 A1 | 9/2016 | Seo et al. |
| 2019/0037586 A1 | 1/2019 | Park et al. |
| 2020/0022144 A1* | 1/2020 | Papasakellariou .... H04L 5/0044 |
| 2020/0053744 A1 | 2/2020 | Hosseini et al. |
| 2021/0399833 A1* | 12/2021 | Sengupta ............ H04L 27/2605 |
| 2023/0163896 A1* | 5/2023 | Lin ........................ H04L 1/1858 370/312 |

FOREIGN PATENT DOCUMENTS

| | | |
|---|---|---|
| CN | 101507300 A | 8/2009 |
| CN | 104170296 A | 11/2014 |
| CN | 105052068 A | 11/2015 |
| CN | 110546911 A | 12/2019 |

(Continued)

OTHER PUBLICATIONS

International Search Report and Written Opinion for PCT Appl. No. PCT/CN2020/106067, mailed Apr. 25, 2021 (9 pages).

(Continued)

*Primary Examiner* — Obaidul Huq
(74) *Attorney, Agent, or Firm* — Foley & Lardner LLP

(57) ABSTRACT

A system and method for multiplexing one or more uplink messages. The system and method include receiving, by a wireless communication device, a transport block of a multicast and broadcast service (MBS) session on a physical downlink shared channel (PDSCH); determining, by the wireless communication device, an overlap in a time domain of a PUCCH corresponding to the PDSCH and an uplink channel (e.g., a second PUCCH, a PUSCH, etc.); and/or transmitting, by the wireless communication device responsive to determining the overlap, another PUCCH.

19 Claims, 9 Drawing Sheets

800

(56)                    References Cited

FOREIGN PATENT DOCUMENTS

CN          110710318  A      1/2020
CN          110798290  A      2/2020
CN          110830176  A      2/2020
WO     WO-2016/119634 A1     8/2016

OTHER PUBLICATIONS

Extended European Search Report for EP Appl. No. 24174209.7, dated Aug. 8, 2024 (8 pages).
First Office Action for CN Appl. No. 202080104764.9, dated Aug. 5, 2024 (with English translation, 28 pages).
LG Electronics, "Discussion on UE feedback for DL multicast/ broadcast", 3GPP TSG RAN WG1 Meeting #85, R1-164537, May 27, 2016, Nanjing, China (5 pages).
3GPP, "Technical Specification Group Services and System Aspects; Release 15 Description; Summary of Rel-15 Work Items (Release 15)," TR 21.915 V15.0.0, 201915-F00, Oct. 1, 2019 (118 pages).
Extended European Search Report on EP 20947118.4 dated Jun. 6, 2023 (10 pages).
Communication pursuant to Article 94(3) EPC for EP Appl. No. 24174209.7, dated Mar. 19, 2025 (8 pages).
Communication pursuant to Article 94(3) EPC for EP Appl. No. 20947118.4, dated Aug. 11, 2025 (9 pages).
Communication pursuant to Article 94(3) EPC for EP Appl. No. 24174209.7, dated Sep. 25, 2025 (6 pages).
Office Action for VN Appl. No. 1-2023-00546, dated Oct. 8, 2025 (with English translation, 4 pages).
Office Action for KR Appl. No. 10-2023-7003650, dated Nov. 17, 2025 (with English translation, 7 pages).

* cited by examiner

600

700

Figure 8:
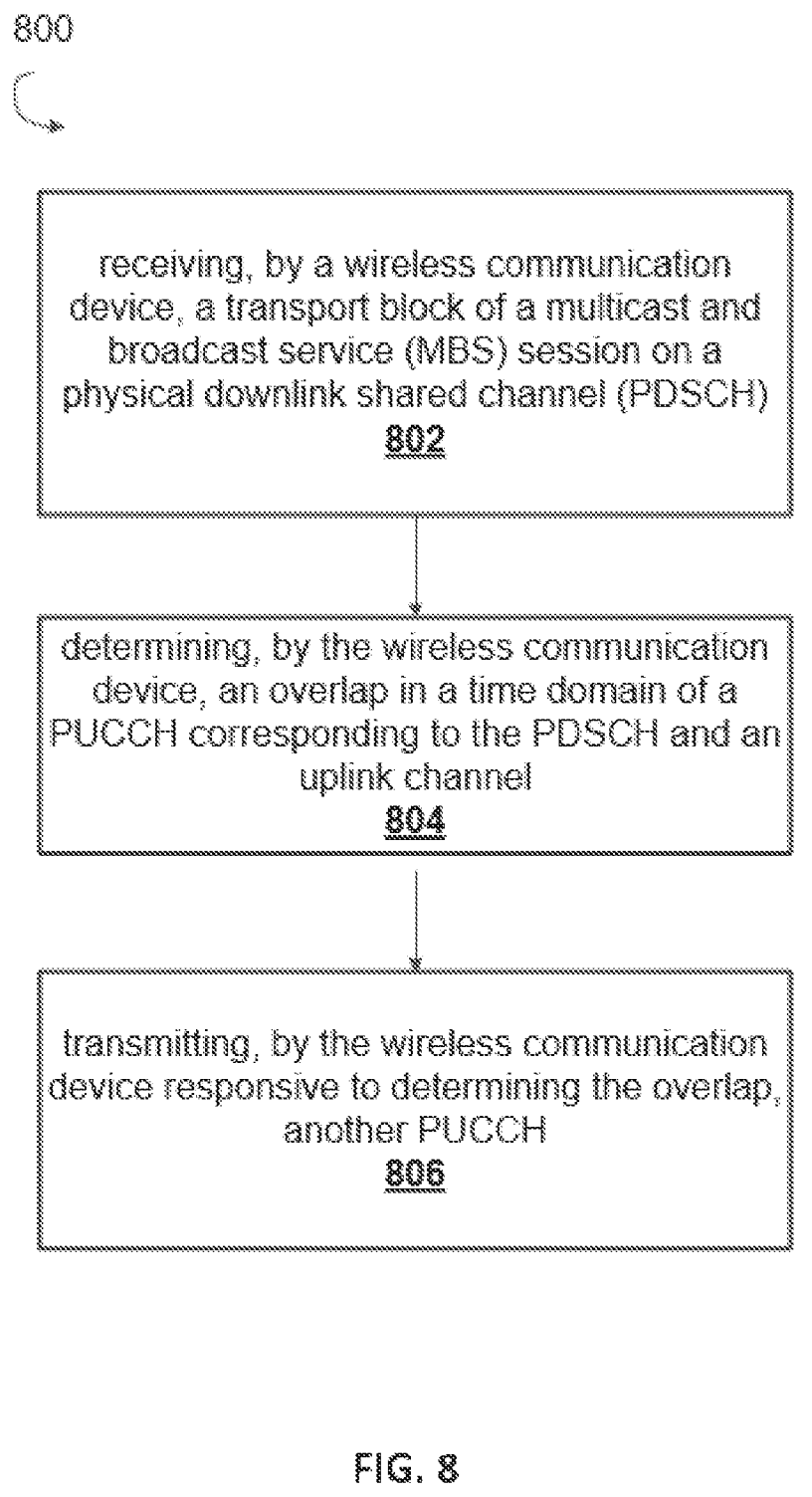

800 receiving, by a wireless communication device, a transport block of a multicast and broadcast service (MBS) session on a physical downlink shared channel (PDSCH)
802 determining, by the wireless communication device, an overlap in a time domain of a PUCCH corresponding to the PDSCH and an uplink channel
804 transmitting, by the wireless communication device responsive to determining the overlap, another PUCCH
806

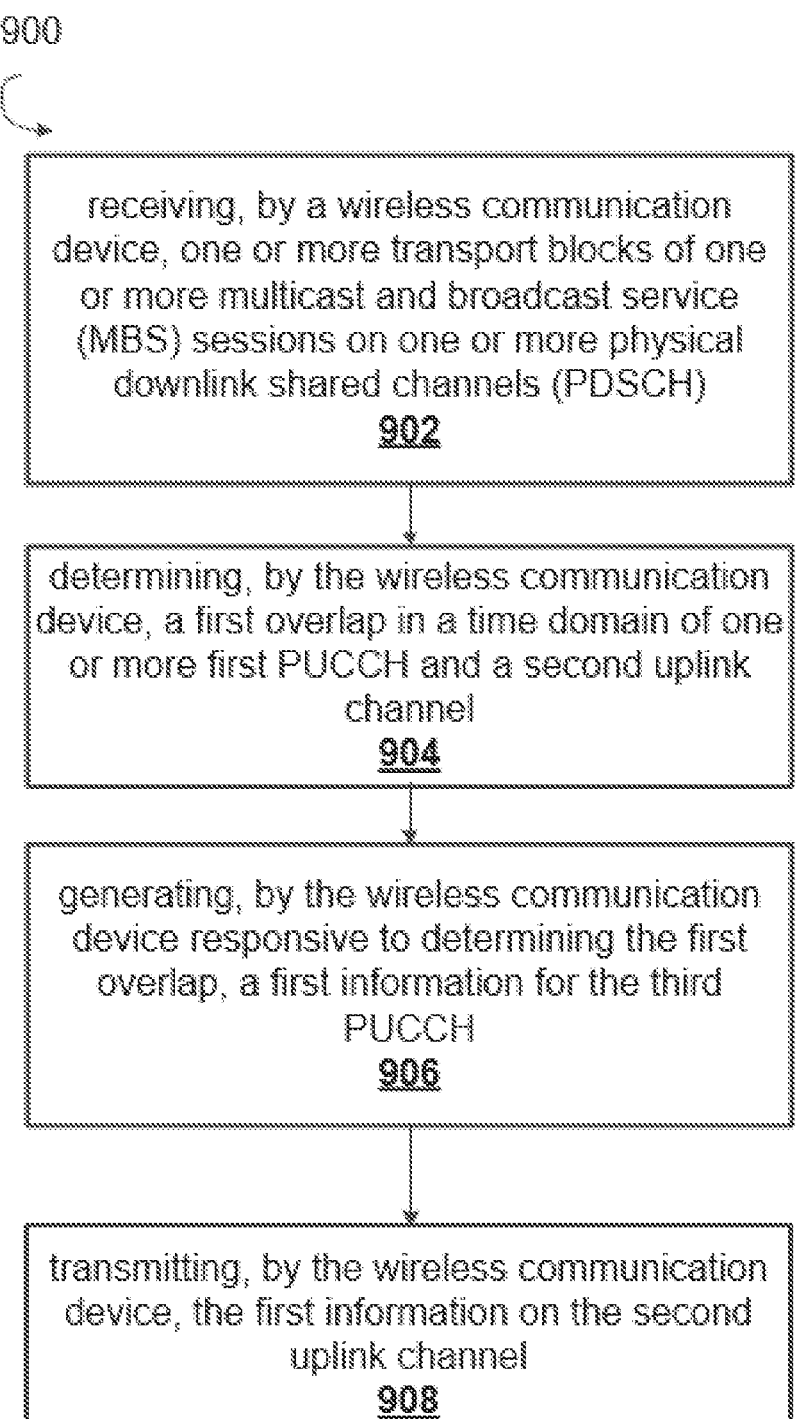

receiving, by a wireless communication device, one or more transport blocks of one or more multicast and broadcast service (MBS) sessions on one or more physical downlink shared channels (PDSCH)
902 determining, by the wireless communication device, a first overlap in a time domain of one or more first PUCCH and a second uplink channel
904 generating, by the wireless communication device responsive to determining the first overlap, a first information for the third PUCCH
906 transmitting, by the wireless communication device, the first information on the second uplink channel
908

FIG. 9

SYSTEM AND METHOD FOR SIGNAL TRANSMISSION

CROSS-REFERENCE TO RELATED APPLICATION

This application claims the benefit of priority under 35 U.S.C. § 120 as a continuation of PCT Patent Application No. PCT/CN2020/106067, filed on Jul. 31, 2020, the disclosure of which is incorporated herein by reference in its entirety.

TECHNICAL FIELD

The disclosure relates generally to wireless communications and, more particularly, to systems and methods for multiplexing one or more uplink messages.

BACKGROUND

In wireless communication system, a physical uplink control channel (PUCCH) resource is configured by the network for a UE. The configuration of a PUCCH resource includes, for example, at least a time domain resource (e.g. the number and the location of orthogonal frequency division multiplexing (OFDM) symbols of the PUCCH), a frequency domain resource (e.g. the number and the location of physical resource blocks (PRBs) or resource elements (REs) of the PUCCH), and a code domain resource (e.g. cyclic shift, or orthogonal cover code).

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one aspect, the present disclosure is directed to a method for multiplexing one or more uplink messages. In some embodiments, the method includes receiving, by a wireless communication device (e.g., UE 104 in FIG. 1), a transport block of a multicast and broadcast service (MBS) session on a physical downlink shared channel (PDSCH). In some embodiments, the method includes determining, by the wireless communication device, an overlap in a time domain of a PUCCH corresponding to the PDSCH and an uplink channel (e.g., a second PUCCH, a PUSCH, etc.). In some embodiments, the method includes transmitting, by the wireless communication device responsive to determining the overlap, another PUCCH.

In another aspect, the present disclosure is directed to a method for multiplexing one or more uplink messages. In some embodiments, the method includes receiving, by a wireless communication device, one or more transport blocks of one or more multicast and broadcast service (MBS) sessions on one or more physical downlink shared channels (PDSCH). In some embodiments, the method includes determining, by the wireless communication device, a first overlap in a time domain of one or more first PUCCH and a second uplink channel. In some embodiments, the method includes generating, by the wireless communication device responsive to determining the first overlap, a first information. In some embodiments, the method includes transmitting, by the wireless communication device, the first information on the second uplink channel.

In another aspect, the present disclosure is directed to a method for multiplexing one or more uplink messages. In some embodiments, the method includes transmitting, by a wireless communication node to a wireless communication device, a transport block of a multicast and broadcast service (MBS) session on a physical downlink shared channel (PDSCH). In some embodiments, the transport block causes the wireless communication device to determine an overlap in a time domain of a PUCCH corresponding to the PDSCH and an uplink channel, and/or transmit, responsive to determining the overlap, another PUCCH to the wireless communication node. In some embodiments, the method includes receiving, by the wireless communication node, the another PUCCH.

In another aspect, the present disclosure is directed to a method for multiplexing one or more uplink messages. In some embodiments, the method includes transmitting, by a wireless communication node to a wireless communication device, one or more transport blocks of one or more multicast and broadcast service (MBS) sessions on one or more physical downlink shared channels (PDSCH). In some embodiments, the one or more transport blocks cause the wireless communication device to determine a first overlap in a time domain of one or more first PUCCH and a second uplink channel, generate, responsive to determining the first overlap, a first information; and/or transmit the first information on the second uplink channel. In some embodiments, the method includes receiving, by the wireless communication node, the first information.

The above and other aspects and their embodiments are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 8 is a flow diagram depicting a method for multiplexing one or more uplink messages, in accordance with some embodiments of the present disclosure.

FIG. 9 is a flow diagram depicting a method for multiplexing one or more uplink messages, in accordance with some embodiments of the present disclosure.

DETAILED DESCRIPTION OF EXEMPLARY EMBODIMENTS

Figure 1:
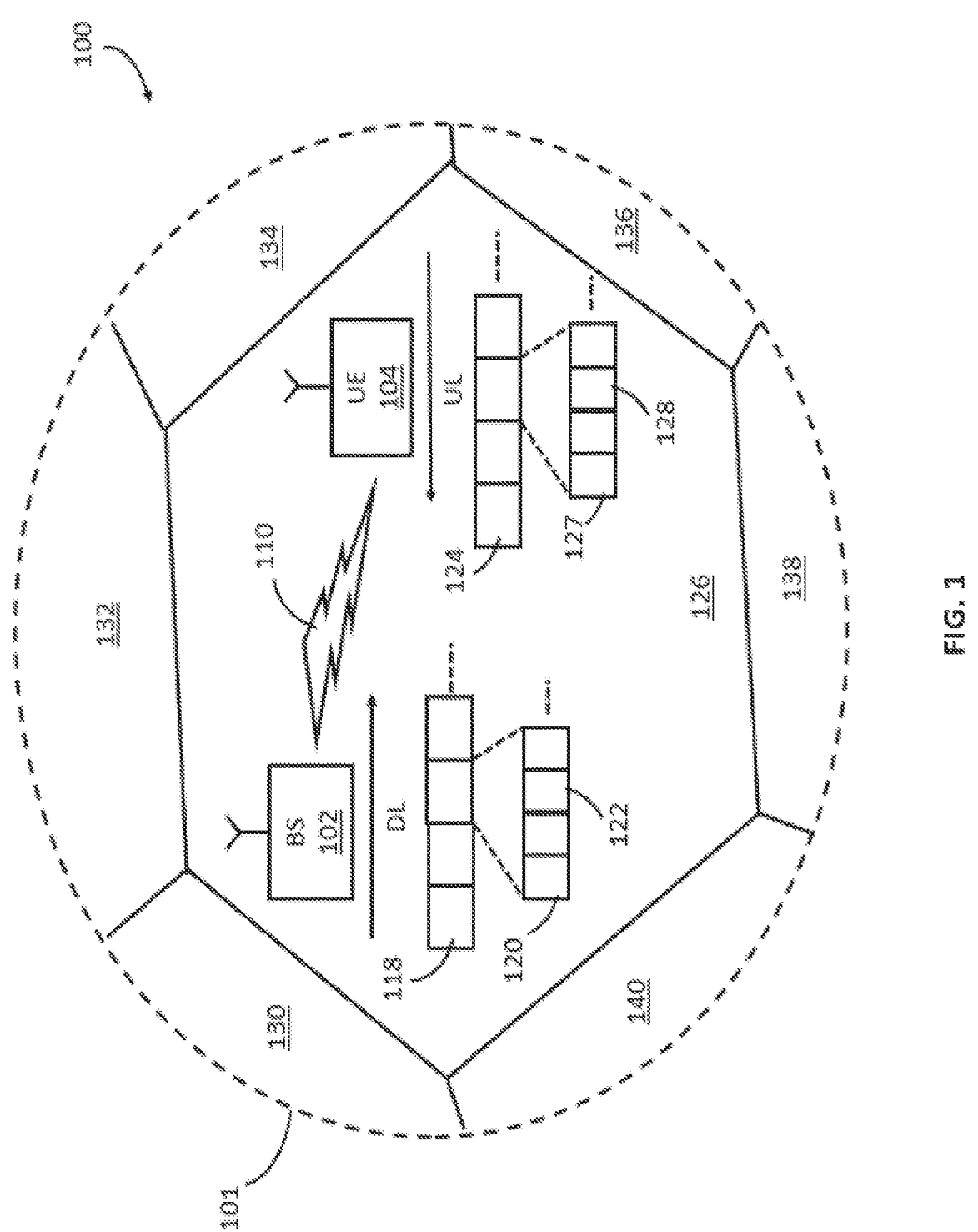
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

3GPP 3rd Generation Partnership Project
5G 5th Generation Mobile Networks
5G-AN 5G Access Network
5G gNB Next Generation NodeB
CCA Clean Channel Access
CCE Control Channel Element
CE Control Element
CG Configured Grant
COT Channel Occupancy Time
DCI Downlink Control Information
DG Dynamic Grant
DL Down Link or Downlink
eMBB Enhanced Mobile Broadband
eNB Evolved Node B
ETSI European Telecommunications Standards Institute
LBT Listen Before Talk/Listen Before Send
LTE Long Term Evolution
MAC Medium Access Control
MBMS Multimedia Broadcast Multicast Service
MBS Multicast and Broadcast Service
MSC Mobile Switching Center
NACK Negative Acknowledgement
NAS Non-Access Stratum
NR Next Generation RAN
OFDM Orthogonal Frequency-Division Multiplexing OFDMA Orthogonal Frequency-Division Multiple Access
OSI Open Systems Interconnection
PDCP Packet Data Convergence Protocol
PDCCH Physical Downlink Control Channel
PDSCH Physical Downlink Shared Channel
PUCCH Physical Uplink Control Channel
PUSCH Physical Uplink Shared Channel
RAN Radio Access Network
RLC Radio Link Control
RNTI radio Network Temporary Identifier
RRC Radio Resource Control
RV Redundancy Version
TB Transport block
UE User Equipment
UL Up Link or Uplink In a wireless communication system (e.g., environment 100 in FIG. 1), a UE (e.g., UE 104 in FIG. 1) receives or is interested to receive one or more multicast services, e.g. multicast and broadcast service (MBS) or Multimedia Broadcast Multicast Service (MBMS). In other words, a UE receives or is interested to receive data of one or more MBS sessions or MBMS sessions, where an MBS session represents a multicast service. When the receiver does not successfully decode the data from the transmitter, then the receiver transmits a negative acknowledgement (NACK-only) message (sometimes referred to as, "a NACK message" or "NACK-only feedback") to the transmitter.

However, the transmission of a NACK-only message by the UE may cause an overlap (e.g., a co-existence, a coincidence, an intersection, etc.) of the NACK-only message with other transmissions (e.g., other NACK-only messages and/or other uplink transmissions) in the time domain. Thus, a mechanism is needed for determining how to multiplex one or more uplink messages (e.g., NACK-only messages).

Accordingly, the systems and methods discussed herein provide a mechanism for multiplexing one or more uplink messages (e.g., NACK-only messages).

In a "first" instance, as discussed in greater detail below, when there exists overlapping between two PUCCHs in the time domain, another PUCCH is transmitted. In some embodiments, the two PUCCHs may be used for NACK-only feedback. In some embodiments, transmitting another PUCCH may represent that the UE would transmit the two PUCCHs.

In a "second" instance, also discussed in greater detail below, when there exist overlapping between one or more PUCCHs and the other uplink transmission in the time domain, a first information is generated and piggybacked on the other uplink transmission. In some embodiments, the PUCCHs are for one or more MBS session. In some embodiments, the PUCCHs are used for NACK-only feedback. In some embodiments, the first information indicates that the UE would transmit the one or more PUCCHs or would not transmit any PUCCH. In some embodiments, the first information is generated in the order of PUCCH resource and the corresponding MBS session. In some embodiments, the length of the first information is $\lceil \log_2(k+1) \rceil$, where k is the number of PUCCH that overlaps with the other uplink transmission. In some embodiments, the length of the first information is k, where k is the number of PUCCH that overlaps with the other uplink transmission. In some embodiments, the time interval between the PDCCH monitoring and the corresponding PUCCH is configured by a RRC signaling, a MAC CE, or a DCI.

US 12,610,368 B2

5

1. Mobile Communication Technology and
Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
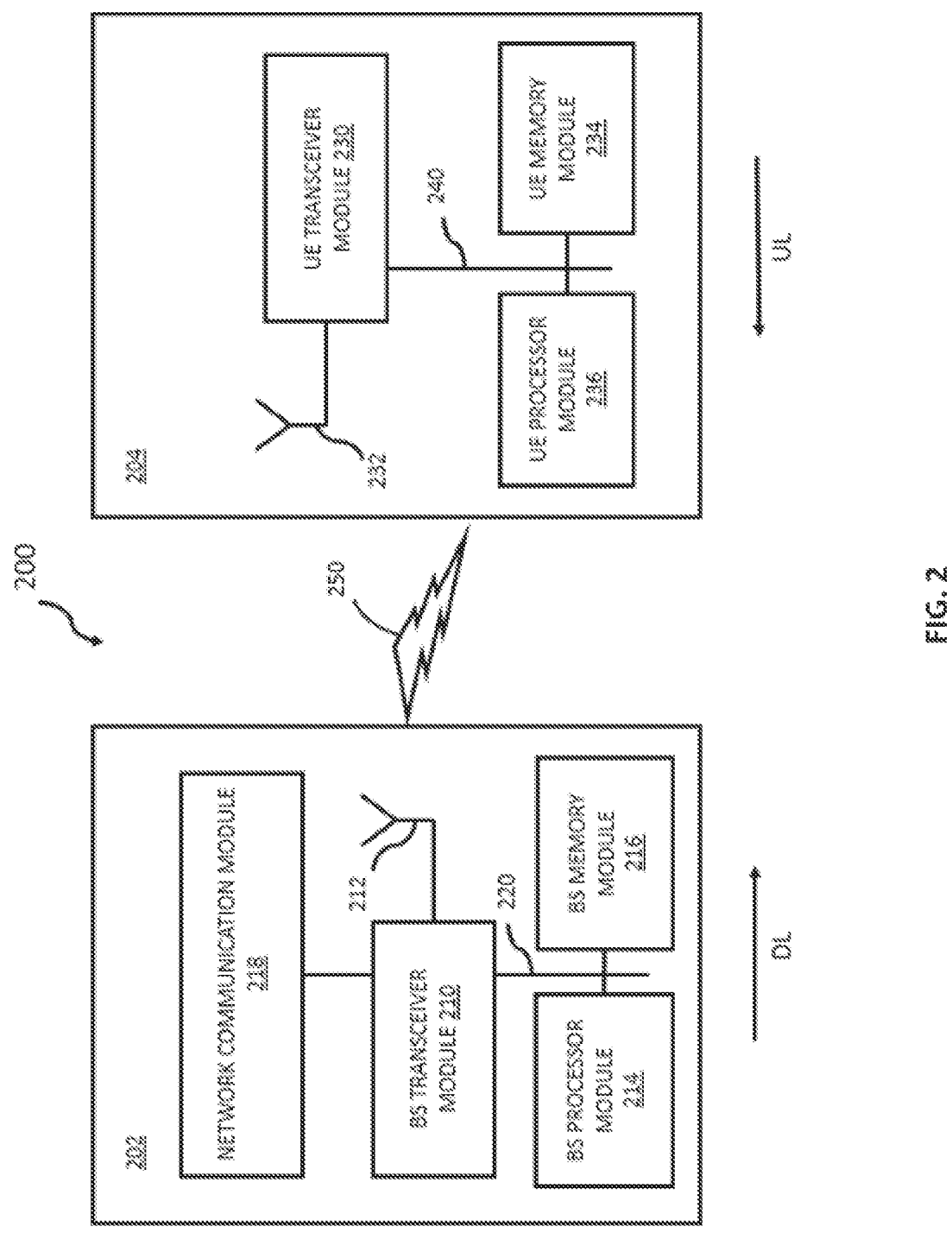
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Exemplary Embodiment(s): Group 1

In some embodiments, the network (e.g., BS 102 in FIG. 1) configures (e.g., initializes, allocates, assigns, etc.) one or more PUCCH resources for a UE. Each PUCCH resource may correspond to one MBS session or a combination of MBS sessions. For a MBS session, if a UE does not correctly decode a transport block carried on a PDSCH, the UE may transmit the corresponding PUCCH. For a MBS session, if a UE correctly decodes a transport block carried on a PDSCH, the UE does not transmit the corresponding PUCCH. In some embodiments, for a MBS session, if more than one transport blocks are carried by a PDSCH and a UE does not correctly decode at least one of the transport blocks, the UE transmits the corresponding PUCCH. For a MBS session, if more than one transport blocks are carried by a PDSCH and a UE correctly decodes all the transport blocks, the UE does not transmit the corresponding PUCCH. The PUCCH resource is indicated by the DCI scheduling the PDSCH for a MBS session.

The time interval (e.g. time offset) between the PDSCH and the corresponding PUCCH is configured by a radio resource control (RRC) signaling or a medium access control (MAC) layer control element (CE) or indicated by the DCI that schedules the PDSCH. In some embodiments, the slot or the sub-slot for PUCCH transmission for a PDSCH is indicated by the DCI that schedules the PDSCH. In some embodiments, the time interval between the PDSCH and the corresponding PUCCH is the time unit offset between the time unit on which the PDSCH is received and the time unit on which PUCCH is transmitted. The time unit is OFDM symbol, sub-slot, mini-slot, slot, sub-frame, or frame.

In some embodiments, the time interval (e.g. time offset) between a PDCCH and the PUCCH corresponding to the PDSCH scheduled by the PDCCH is configured by a RRC signaling, a MAC CE. In some embodiments, the time interval between the PDCCH and the corresponding PUCCH is the time unit offset between the time unit on which the PDCCH is received and the time unit on which PUCCH is transmitted.

In some embodiments, the time interval (e.g. time offset) between a PDCCH and the PUCCH corresponding to the PDSCH scheduled by the PDCCH is configured by the DCI carried on the PDCCH. The PUCCH is not allowed to overlap with other uplink transmission in the time domain. The other uplink transmission is used for unicast transmission, such as PUSCH carrying unicast data or PUCCH for unicast transmission. From the perspective of the UE, the UE does not expect the PUCCH resource overlap with other uplink transmission in the time domain when the PUCCH resource is indicated by the DCI. From the perspective of the network, the network shall configure different time resource for the PUCCH and other uplink transmission without overlapping in the time domain.

In some embodiments, a UE does not correctly decode the transport blocks for more than one MBS sessions. The UE would transmit more than one PUCCHs and each PUCCH resource corresponds to one MBS session. If there exists overlapping between these PUCCHs in the time domain or if these PUCCHs are transmitted on the same slot or sub-slot, the UE transmit a second PUCCH, where the second PUCCH resource corresponds to the combination of these MBS sessions. In some embodiments, the second PUCCH and these PUCCHs has the same time domain resource, e.g. they have the same number and location of OFDM symbols. In some embodiments, the second PUCCH and these PUCCHs are on the same slot or sub-slot. In some embodiments, receiving, by a wireless communication device, a transport block of a multicast and broadcast service (MBS) session on a physical downlink shared channel (PDSCH). In some embodiments, the wireless communication device determines an overlap in a time domain of a PUCCH corresponding to the PDSCH and an uplink channel. In some embodiments, the wireless communication device transmits, responsive to determining the overlap, another PUCCH. In some embodiments, a wireless communication device receives a second transport block of a second MBS session on a second PDSCH, and the second PUCCH corresponds to the second PDSCH. In some embodiments, the wireless communication device determines a failure to decode the transport block of the MBS session. In some embodiments, the wireless communication device determines a failure to decode the second transport block of the second MBS session.

Figure 3:
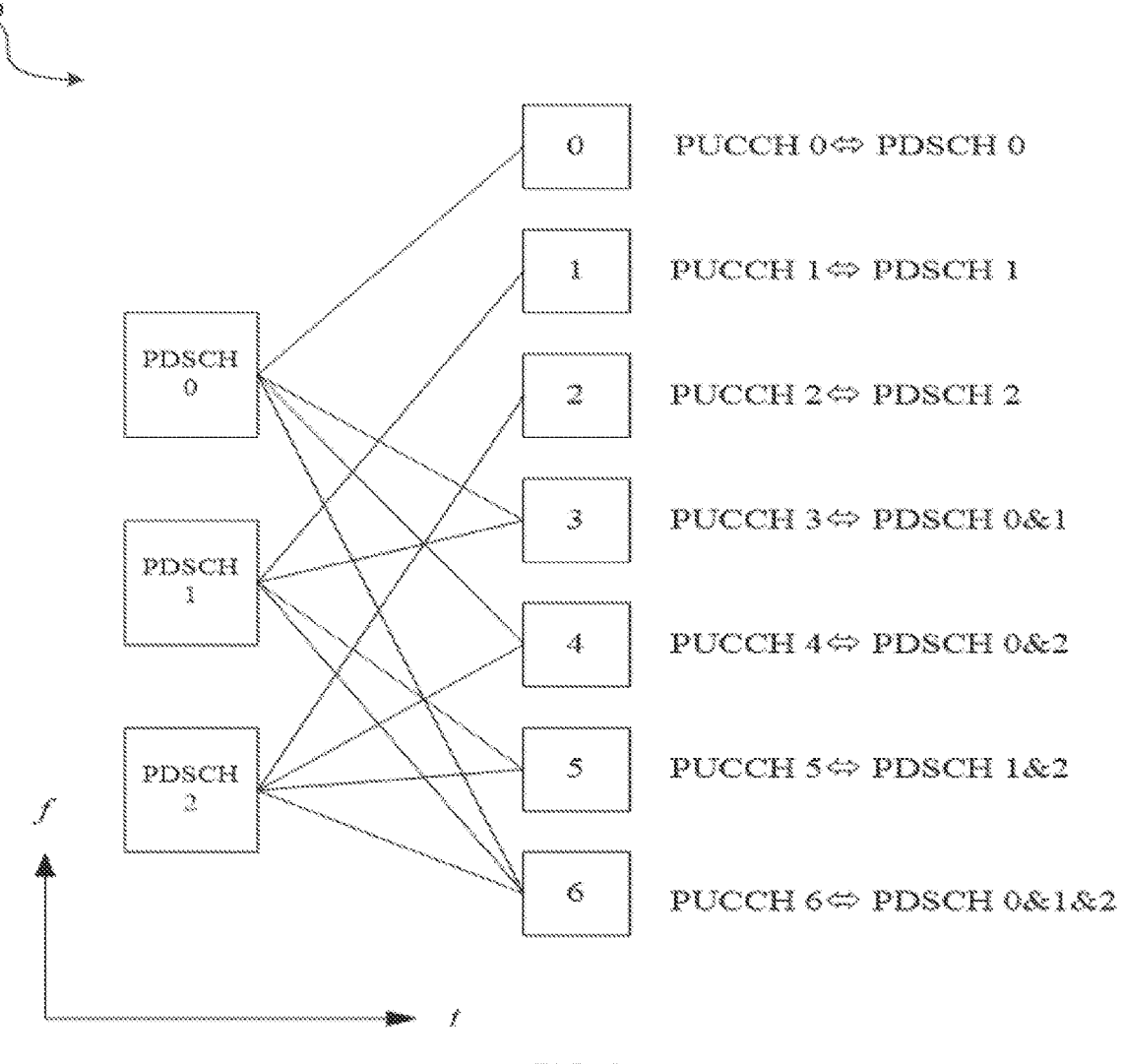
FIG. 3 illustrates a block diagram of an example PUCCH transmission, in accordance with some embodiments of the present disclosure.

FIG. 3 illustrates a block diagram of an example PUCCH transmission, in accordance with some embodiments of the present disclosure. A UE (e.g., UE 104 in FIG. 1) receives 3 MBS services denoted by MBS 0, 1, 2, respectively. As shown in FIG. 3, PDSCH 0, 1, 2 carries data of MBS session 0, 1, 2, respectively. There may be 7 PUCCH resources denoted by PUCCH 0~7, respectively. In some embodiments, PUCCH 0~7 may occupy different time domain resource, and/or frequency domain resource, and/or code domain resource. PUCCH resource 0 corresponds to MBS session 0 (e.g. PDSCH 0). PUCCH resource 1 corresponds to MBS session 1 (e.g. PDSCH 1). PUCCH resource 2 corresponds to MBS session 2 (e.g. PDSCH 2). PUCCH resource 3 corresponds to the combination of MBS session 0 and MBS session 1 (e.g. PDSCH 0 and 1). PUCCH resource 4 corresponds to the combination of MBS session 0 and MBS session 2 (e.g. PDSCH 0 and 2). PUCCH resource 5 corresponds to the combination of MBS session 1 and MBS session 2 (e.g. PDSCH 1 and 2). PUCCH resource 6 corresponds to the combination of MBS session 0, MBS session 1 and MBS session 2 (e.g. PDSCH 0, 1 and 2). In some embodiments, if a UE does not correctly decode the transport block carried on PDSCH 0, the UE transmits PUCCH 0. In some embodiments, if a UE correctly decodes the transport block carried on PDSCH 0, the UE does not transmit PUCCH 0. In some embodiments, if a UE does not correctly decode the transport block carried on PDSCH 1, the UE transmits PUCCH 1. In some embodiments, if a UE correctly decodes the transport block carried on PDSCH 1, the UE does not transmit PUCCH 1. In some embodiments, if a UE does not correctly decode both the transport blocks carried on PDSCH 0 and 1, the UE will transmit PUCCH 0 and PUCCH 1. The PUCCH 0 and PUCCH 1 overlaps in the time domain, and therefore the UE only transmits PUCCH 3 since PUCCH 3 corresponding PDSCH 0 and 1. In some embodiments, if a UE does not correctly decode the transport blocks carried on PDSCH 0, 1 and 2, the UE will transmits PUCCH 0, PUCCH 1 and 2. PUCCH 0, PUCCH 1 and PUCCH 2 overlaps in the time domain, and therefore the UE only transmits PUCCH 6 since PUCCH 6 corresponding PDSCH 0, 1 and 2.

In some embodiments, a parameter or configuration is used to identify the transmission of MBS session, for example, radio network temporary identifier (RNTI), logical channel identity, search space, control resource set, physical downlink control channel (PDCCH) monitoring occasion, downlink control information (DCI) format, PDCCH candidate, or control channel element (CCE) index, multicast traffic channel (MTCH), temporary mobile group identity (TMGI), etc. A PUCCH resource corresponds to one MBS session. That is, a PUCCH resource may correspond to the parameter or configuration used to identify the transmission of the MBS session. In some embodiments, the transport block of the MBS session corresponds to a parameter comprising at least one of a radio network temporary identifier (RNTI), a logical channel identity, a search space, a control resource set, a PDCCH monitoring occasion, a downlink control information (DCI) format, a PDCCH candidate, a control channel element (CCE) index of a PDCCH, and a multicast traffic channel (MTCH).

Taking RNTI as an example, a RNTI value corresponds to a MBS session. A PDSCH (or transport block) scheduled by the DCI format with a RNTI value carries the data of the corresponding MBS session. Each PUCCH resource corresponds to a DCI format with a special RNTI or a combination of DCI formats with their respective RNTI. In some embodiments, if a UE does not correctly decode a transport block scheduled by a DCI format with a special RNTI, the UE transmit the PUCCH corresponding to the RNTI. In some embodiments, if a UE correctly decodes a transport block scheduled by a DCI format with a special RNTI, the UE does not transmit the PUCCH corresponding to the RNTI. As shown in FIG. 3, if a first RNTI is configured for MBS session 0, PDSCH 0 may be scheduled by a DCI format with the first RNTI. In some embodiments, if a second RNTI is configured for MBS session 1, PDSCH 1 shall be scheduled by a DCI format with a second RNTI. In some embodiments, if a third RNTI is configured for MBS session 2, PDSCH 2 may be scheduled by a DCI format with a third RNTI.

3. Exemplary Embodiment(s): Group 2

In some embodiments, a third PUCCH is configured by the network for a UE. If a UE does not correctly decode a transport block, the UE transmits the third PUCCH. In some embodiments, if a UE correctly decodes a transport block, the UE does not transmit the third PUCCH. In some embodiments, if the third PUCCH would overlap with a fourth uplink transmission in the time domain, the UE generates a code bit for the third PUCCH and transmits the fourth uplink transmission carrying the generated code bit additionally, and in some embodiments, the UE does not transmit the third PUCCH. In some embodiments, the generated code bit may be called, "first information". A value of the code bit for the first information represents (e.g. indicates, means) that the UE would or would not transmit the third PUCCH. For example, a first information bit value of 0 represents the UE would not transmit the third PUCCH. A first information bit value of 1 represents the UE would transmit the third PUCCH.

In some embodiments, a plurality of PUCCH resources are configured by the network for a UE. The plurality of PUCCH resources corresponds to a MBS session. The plurality of PUCCH resources correspond to a plurality of PDCCH monitoring occasions with a one-to-one mapping. Each PUCCH resource corresponds to a PDCCH monitoring occasion. In some embodiments, if a UE does not correctly decode the transport blocks scheduled by a DCI format (or PDCCH) transmitted on a PDCCH monitoring occasion, the UE transmits the PUCCH corresponding to the PDCCH monitoring occasion. In some embodiments, if a UE correctly decodes the transport blocks scheduled by a DCI format (or PDCCH) transmitted on a PDCCH monitoring occasion, the UE does not transmit corresponding PUCCH. One or more transport blocks are scheduled by the DCI format (or PDCCH). In some embodiments, the time interval (e.g. time offset) between a PDCCH monitoring occasion and the corresponding PUCCH resource is configured by a RRC signaling, a MAC CE, or a DCI (e.g. PDCCH) transmitted on the PDCCH monitoring.

In some embodiments, the plurality of PDCCH monitoring occasions are configured to schedule the same data for the MBS session. In other words, the transport blocks scheduled by the DCI (or PDCCH) transmitted on these PDCCH monitoring occasions may carry the same data (e.g. MAC PDU). If a UE does not correctly decode all the transport blocks scheduled by DCI (or PDCCH) transmitted on these PDCCH monitoring occasions, the UE transmits one or more PUCCHs corresponding to these PDCCH monitoring occasions. In some embodiments, it is up to UE to select one or more PUCCHs among these PUCCHs for transmission. In some embodiments, the UE selects one or more PUCCHs which corresponding to the reference signal (RS) with highest signal quality (e.g. reference signal received power (RSRP)). The RS corresponding to the PUCCH is in the spatial relationship configured for the PUCCH. If a UE correctly decodes at least one of transport blocks scheduled by DCI (or PDCCH) transmitted on these PDCCH monitoring occasions, the UE will not transmit any PUCCH corresponding to these PDCCH monitoring occasions.

In some embodiments, the plurality of PUCCHs would overlap with a fourth uplink transmission in the time domain. The UE generates one or more code bits (called the first information) and transmits the fourth uplink transmission carrying the generated code bits additionally. In some embodiments, the UE does not transmit the plurality of PUCCHs. In some embodiments, the length of the generated first information bits is $\lceil \log_2(k+1) \rceil$, where k is the number of PUCCH resources that overlap with the fourth uplink transmission. A value of the code bits for the first information bits represents (e.g. indicates, means) that the UE would transmit one of the plurality of PUCCHs or the UE would not transmit any of the plurality of PUCCH. For example, an all-zero value for the first information of 0 . . . 000 (e.g., $\lceil \log_2(k+1) \rceil$) represents that the UE would not transmit any PUCCH. The first information indicates the UE would transmit one of the plurality of PUCCHs in order (e.g. ascending order or descending order) of the time domain resource (e.g. the starting time or starting symbol) of the PUCCH resources. For example, the first information value of 0 . . . 001 (e.g., $\lceil \log_2(k+1) \rceil$) represents that the UE would transmit the PUCCH resource with the earliest starting time. The first information value of 0 . . . 010 (e.g., $\lceil \log_2(k+1) \rceil$) represents that the UE would transmit the PUCCH resource with the second earliest starting time, and so on. In some embodiments, the first information indicates the UE would transmit one of the plurality of PUCCHs in order (e.g. ascending order or descending order) of the frequency domain resource (e.g. starting PRB or starting RE) of the PUCCH resources. In some embodiments, the first information indicates the UE would transmit one of the plurality of PUCCHs in order (e.g. ascending order or descending order) of code domain resource (e.g. cyclic shift index or OCC index) of the PUCCH resources. In some embodiments, the first information indicates the UE would transmit one of the plurality of PUCCHs in order of (e.g. ascending order or descending order) any combination of time domain resource, frequency domain resource and code domain resource of the PUCCH. For example, the first information indicates the UE would transmit one of the plurality of PUCCHs in order of (e.g. ascending order or descending order) first the time domain resource (e.g. starting time or starting symbol), then the frequency domain resource (e.g. the starting PRB or starting RE), then the code domain resource (e.g. cyclic shift index or OCC index) of the PUCCH resources.

In some embodiments, receiving, by a wireless communication device, one or more transport blocks of one or more multicast and broadcast service (MBS) sessions on one or more physical downlink shared channels (PDSCH), and determining, by the wireless communication device, a first overlap in a time domain of one or more first PUCCH and a second uplink channel, and generating, by the wireless communication device responsive to determining the first overlap, a first information, and transmitting, by the wireless communication device, the first information on the second uplink channel. In some embodiments, determining, by the wireless communication device, a failure to decode a transport block of a MBS session, and transmitting, by the wireless communication device, one of the PUCCH responsive to the failure to decode the transport block, wherein the PUCCH corresponds to the transport block. In some embodiments, determining, by the wireless communication device, a success to decode the transport block of the MBS session, and not transmitting, by the wireless communication device, one of the PUCCH responsive to the success to decode the transport block, wherein the PUCCH corresponds to the transport block. In some embodiments, determining, by the wireless communication device, a failure to decode the downlink control information (DCI) on a PDCCH monitoring occasion of the MBS session, and transmitting, by the wireless communication device, one of the PUCCH responsive to the failure to decode the DCI on the PDCCH monitoring occasion, wherein the PUCCH resource corresponds to the PDCCH monitoring occasions. In some embodiments, determining, by the wireless communication device, a success to decode the downlink control information (DCI) on a PDCCH monitoring occasion of the MBS session, and not transmitting, by the wireless communication device, one of the PUCCH responsive to the success to decode the DCI on the PDCCH monitoring occasion, wherein the PUCCH resource corresponds to the PDCCH monitoring occasions. In some embodiments, a length of the first information corresponds to $\lceil \log_2(k+1) \rceil$, and wherein k corresponds to the number of PUCCH resources that overlap with the uplink transmission. In some embodiments, a value of the first information indicates that the wireless communication device will transmit one of the PUCCH that overlaps with the second uplink channel, or a value of the first information indicates that wireless communication device will not transmit any of the PUCCH that overlaps with the second uplink channel.

Figure 4:
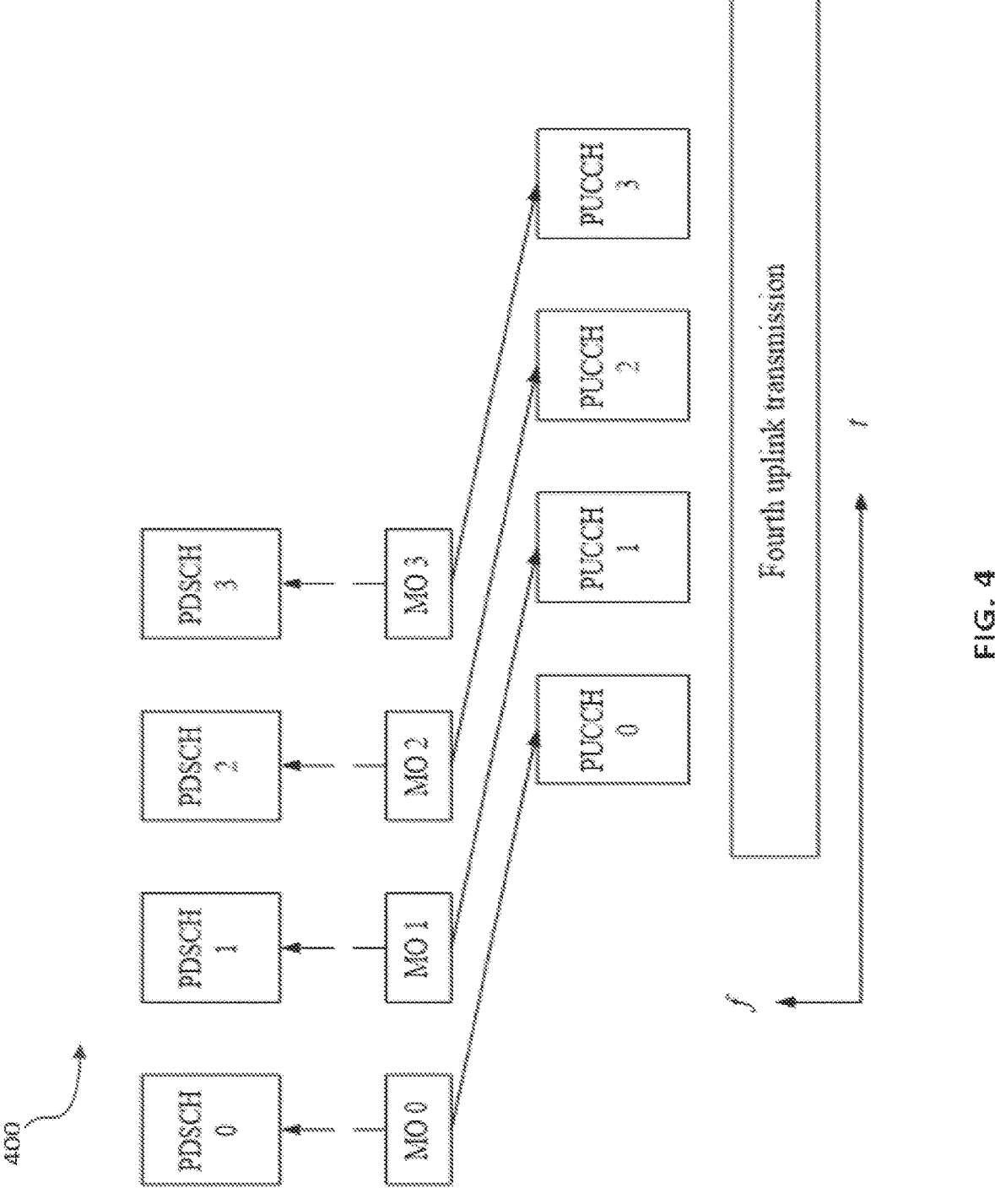
FIG. 4 illustrates an example diagram of overlapping of PUCCHs and an uplink transmission, in accordance with some embodiments of the present disclosure.

FIG. 4 illustrates an example diagram of overlapping of PUCCHs and an uplink transmission, in accordance with some embodiments of the present disclosure. There are totally 4 PUCCH resources denoted by PUCCH 0~3, respectively overlapping with a fourth uplink transmission. 4 PUCCH resources correspond to 4 PDCCH monitoring occasions (denoted by MO 0~3, respectively). PUCCH 0 corresponds to MO 0, PUCCH 1 corresponds to MO 1, and so on. PDCCHs transmitted on MO 0~3 schedule PDSCH 0~3, respectively. In some embodiments, if a UE does not correctly decode a transport block scheduled by MO 0 (i.e. transport block carried on PDSCH 0), the UE will transmit PUCCH 0. If a UE correctly decodes a transport block scheduled by MO 0 (i.e. transport block carried on PDSCH 0), the UE will not transmit PUCCH 0.

In some embodiments, if it is configured that MO 0~3 schedule the same data, then PDSCH 0~3 may carry the same data (e.g. transport block, or MAC PDU). In some embodiments, if a UE correctly decodes at least one of PDSCH 0~3 (e.g. transport blocks carried on PDSCH 0~3), the UE will not transmit PUCCH 0~3. In some embodiments, if a UE does not correctly all the PDSCH 0~3 (e.g. transport blocks carried on PDSCH 0~3), the UE will transmit one or more of the PUCCH 0~3.

Since there exists overlapping between PUCCH with the fourth uplink transmission, the UE generates the first information and does not transmit any of PUCCH 0~3. Since the number of PUCCH resources overlapping with the fourth uplink transmission is 4, the length of first information bits is $\lceil \log_2(4+1) \rceil=3$. In some embodiments, if a UE would not transmit any of the 4 PUCCHs, a first information bits value of '000' is generated. In some embodiments, if a UE would transmit PUCCH 0, a first information bits value of '001' is generated. In some embodiments, if a UE would transmit PUCCH 1, a first information bits value of '010' is generated. In some embodiments, if a UE would transmit PUCCH 2, a first information bits value of '011' is generated. In some embodiments, if a UE would transmit PUCCH 3, a first information bits value of '100' is generated. In some embodiments, the first information bits will be carried by the fourth uplink transmission and UE will transmit the fourth uplink transmission.

In some embodiments, the length of the first information bits is k, where k is the number of PUCCH resources that overlap with the fourth transmission. A value for the first information bits represents (e.g. indicates) that the UE would transmit one or more of the plurality of PUCCHs or the UE would not transmit any PUCCH. In some embodiments, the plurality of PUCCHs are arranged in order (e.g. ascending order or descending order) of one or any combination of time resource, frequency resource and code resource of the PUCCH. The first information bits have an in-order one-to-one mapping with the k PUCCH resources such that the most significant bit corresponds to the first PUCCH resource, the second bit corresponds to the second PUCCH resource, and so on. The bit value in the first information bits represents the UE would or would not transmit the corresponding PUCCH resource. For example, a first information bit value of 0 represents the UE would not transmit the corresponding PUCCH. A first information bit value of 1 represents the UE would transmit the corresponding PUCCH. In some embodiments, a length of the first information corresponds to k, and wherein k corresponds to the number of PUCCH resources that overlap with the uplink transmission. In some embodiments, each bit of the first information corresponds to a PUCCH of the PUCCH that overlap with the second uplink channel, wherein a value of the bit of the first information indicates that the wireless communication device will transmit the corresponding PUCCH, or a value of the bit of the first information indicates that the wireless communication device will not transmit the corresponding PUCCH. In some embodiments, generating, by the wireless communication device, the first information in an order of one or more PUCCHs and corresponding MBS sessions.

Still referring to FIG. 4, since the number of PUCCH resources overlapping with the fourth uplink transmission is 4, the length of first information bits is 4. In some embodiments, if a UE would transmit PUCCH 0, a first information bits value of '1000' is generated. In some embodiments, if a UE would transmit PUCCH 1, a first information bits value of '0100' is generated. In some embodiments, if a UE would transmit PUCCH 2, a first information bits value of '0010' is generated. In some embodiments, if a UE would transmit PUCCH 3, a first information bits value of '0001' is generated. In some embodiments, if a UE would transmit PUCCH 0 and PUCCH 1, a first information bits value of '1100' is generated.

In some embodiments, the fourth uplink transmission is a physical uplink shared channel (PUSCH). In some embodiments, the PUSCH only carries uplink shared channel (UL-SCH). The generated first information bits are multiplexed with the code bits for UL-SCH. Then the PUSCH carrying the multiplexed code bits is transmitted by the UE. In some embodiments, the PUSCH carries uplink control information (UCI) and UL-SCH. The generated first information bits are appended (e.g., concatenated) to the code bits for the UCI. The new code bits (appended code bits) are multiplexed with the code bits for UL-SCH. Then the PUSCH carrying the multiplexed code bits is transmitted by the UE. In some embodiments, the code bits of UCI includes more than one parts of code bits, such as code bits for hybrid automatic repeat request acknowledgement (HARQ-ACK), code bits for channel state information (CSI), etc. The generated first information bits are appended (e.g., concatenated) to the code bits for HARQ-ACK in the UCI.

In some embodiments, the fourth uplink transmission is a PUCCH (called fourth PUCCH). The PUCCH carries code bits of UCI. The generated first information is appended (e.g., concatenated) to the code bits of the UCI. The second PUCCH carrying the new code bits (appended code bits) is transmitted by the UE. In some embodiments, multiplexing, by the wireless communication device, the first information bits and uplink shared channel (UL-SCH); and transmitting, by the wireless communication device, the uplink channel carrying the multiplexed code bits. In some embodiments, concatenating, by the wireless communication, the first information bits and uplink control information (UCI) bits carried by the second uplink channel originally, and multiplexing, by the wireless communication device, the concatenated bits and uplink shared channel (UL-SCH), if any, and transmitting, by the wireless communication device, the uplink channel carrying the multiplexed code bits.

Figure 5:
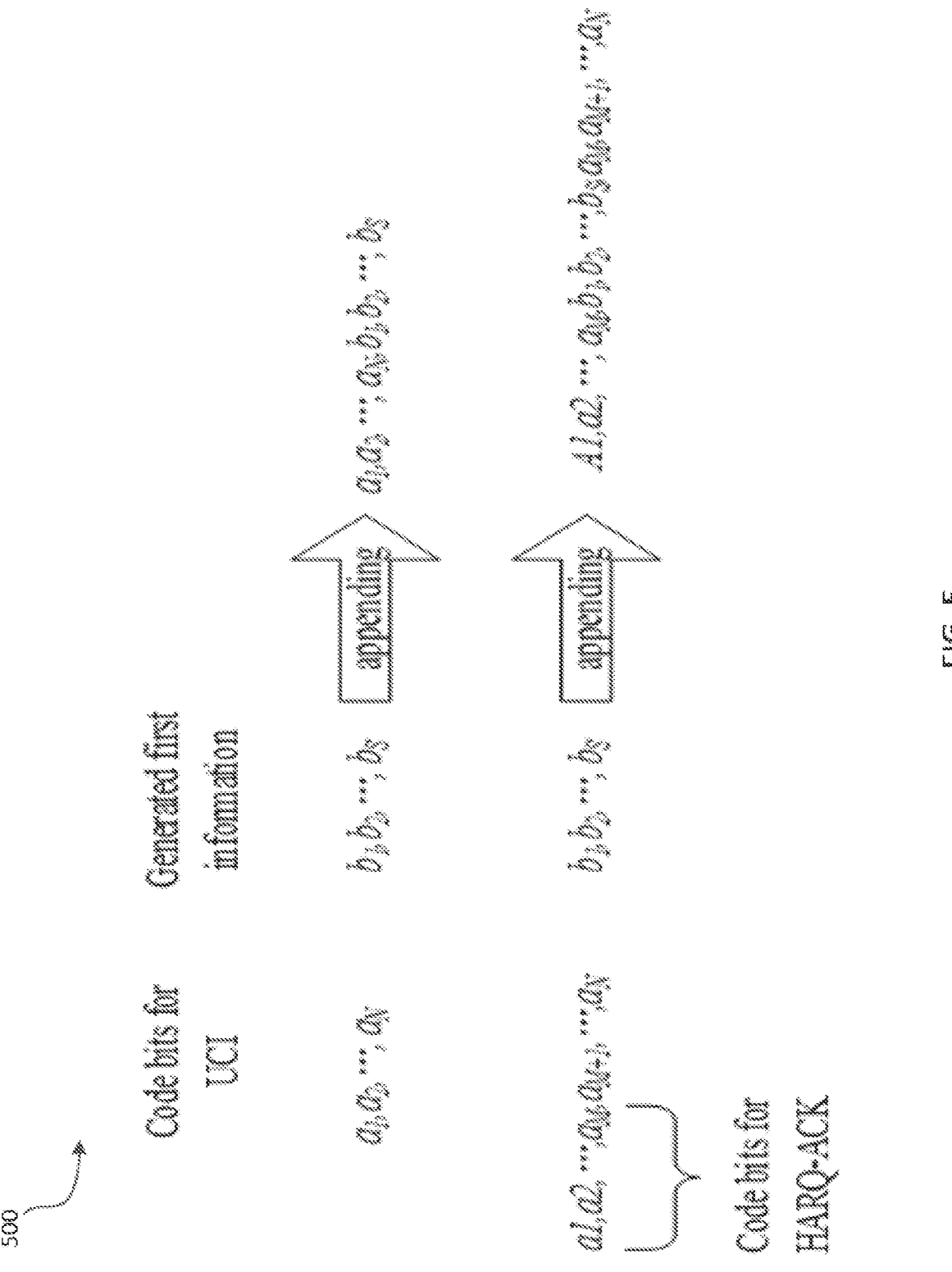
FIG. 5 illustrates an example diagram of appending of generated first information bits, in accordance with some embodiments of the present disclosure.

FIG. 5 illustrates an example diagram of appending of generated first information bits, in accordance with some embodiments of the present disclosure. The generated first information bits are $b_1, b_2, \ldots b_S$. In some embodiments, the codes bits for UCI are $a_1, a_2, \ldots, a_N$. After appending, the new code bits are $a_1, a_2, \ldots, a_N, b_1, b_2, \ldots, b_S$. In some embodiments, the codes bits for UCI are $a_1, a_2, \ldots, a_M, a_{M+1}, \ldots, a_N$, where the code bits for HARQ-ACK are $a_1, a_2, \ldots, a_M$. After appending the generated first information bits to the code bits for HARQ-ACK, the new code bits are $a_1, a_2, \ldots, a_M, a_{M+1}, \ldots, a_N, b_1, b_2, \ldots, b_S$.

In some embodiments, the third PUCCH is used for multicast service. The plurality of PUCCH resources are used for multicast service. In some embodiments, the fourth uplink transmission is used for unicast service.

4. Exemplary Embodiment(s): Group 3

In some embodiments, a plurality of groups of PUCCH resources are configured by the network for a UE. A group of PUCCH resources includes one or more PUCCH resources for a MBS session. Each of the PUCCH resources within a group corresponds to a PDCCH monitoring occasion.

In some embodiments, the plurality of groups of PUCCH resources would overlap with a fifth uplink transmission in the time domain. The UE generates one or more HARQ-ACK information bits and transmits the fifth uplink transmission carrying the generated HARQ-ACK information bits. The UE first generates HARQ-ACK information bits for each group in accordance with the scheme in some embodiments (e.g., embodiments disclosed in Group 2, as discussed herein). Then the generated HARQ-ACK information bits for each group are concatenated. In some embodiments, the concatenation is performed in the order (e.g., ascending order or descending order) of group index, MBS session index, or the parameter or configuration used to identified the transmission of MBS session (e.g., RNTI, search space index, control resource set index, etc.). The code bits after HARQ-ACK information bits concatenation are carried by the fifth uplink transmission in accordance with the scheme in some embodiments (e.g., embodiments disclosed in Group 2, as discussed herein).

Figure 6:
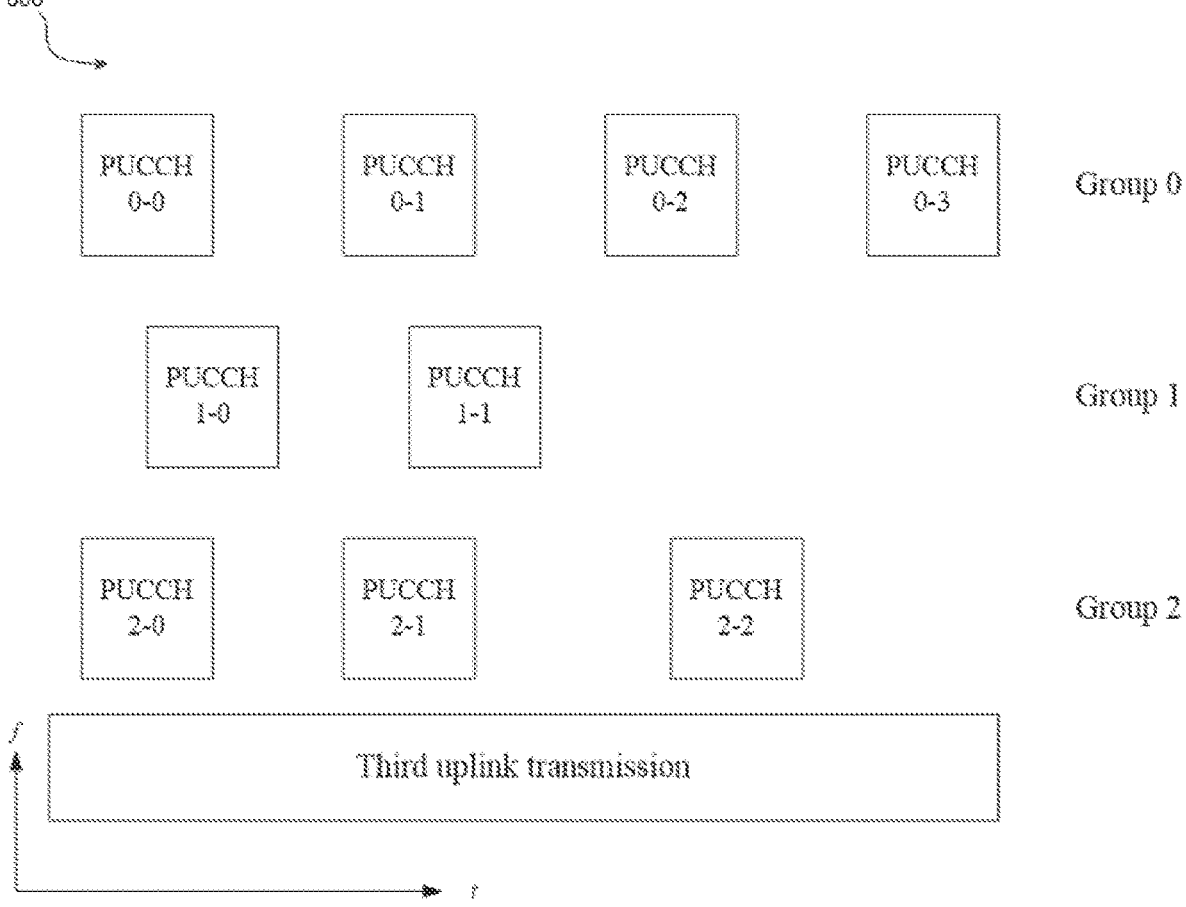
FIG. 6 illustrates an example diagram of overlapping of PUCCHs and an uplink transmission, in accordance with some embodiments of the present disclosure.

FIG. 6 illustrates an example diagram of overlapping of PUCCHs and an uplink transmission, in accordance with some embodiments of the present disclosure. Three groups of PUCCH resources denoted by group 0~2, respectively, are configured for 3 MBS sessions. Group 0 includes 4 PUCCH resources denoted by PDSCH 0-0, PUCCH 0-1, PUCCH 0-2, PUCCH 0-3. Group 1 includes 2 PUCCH resources denoted by PDSCH 1-0, PUCCH 1-1. Group 2 includes 3 PUCCH resources denoted by PDSCH 2-0, PUCCH 2-1, PUCCH 2-2. In some embodiments, if a UE would transmit PUCCH 0-1 and PUCCH 2-2, HARQ-ACK information bits value of '010', '00' and '11' are generated for group 0~2, respectively. The generated HARQ-ACK information bits are concatenated to be '0100011' in the order of group index. The concatenated code bits '0100011' will be carried by the fifth uplink transmission. In some embodiments, if a UE would like to transmit PUCCH 0-0, PUCCH 0-3, and PUCCH 2-2, HARQ-ACK information bits value of '1001', '00' and '001' are generated for group 0~2, respectively. The generated HARQ-ACK information bits are concatenated to be '100100001' in the order of group index. The concatenated code bits '100100001' will be carried by the fifth uplink transmission.

5. Exemplary Embodiment(s): Group 4

In some embodiments, a sixth PUCCH resource is configured by the network for a UE. The sixth PUCCH corresponds to one or more PDCCH monitoring occasions for a MBS session. If a UE does not successfully detect (e.g. decode, receive) any DCI (PDCCH) transmitted on the one or more PDCCH monitoring occasions for the UE, the UE will transmit the sixth PUCCH. If a UE successfully detects at least one DCI (PDCCH) transmitted on the one or more PDCCH monitoring occasions for the UE, the UE will not transmit the sixth PUCCH. The time interval between the sixth PUCCH resource and the corresponding PDCCH monitoring occasions is configured by a RRC signaling, a MAC CE or a DCI.

In some embodiments, a plurality of PUCCH resources are configured by the network for a UE. The plurality of PUCCH resources corresponds to a MBS session. The plurality of PUCCH resources correspond to a plurality of PDCCH monitoring occasions with a one-to-one mapping. Each PUCCH resource corresponds to a PDCCH monitoring occasion. If a UE does not correctly decode the transport blocks scheduled by a DCI format (or PDCCH) transmitted on a PDCCH monitoring occasion, the UE transmits the PUCCH corresponding to the PDCCH monitoring occasion. If a UE correctly decodes the transport blocks scheduled by a DCI format (or PDCCH) transmitted on a PDCCH monitoring occasion, the UE does not transmit corresponding PUCCH.

In some embodiments, the sixth PUCCH resource and at least one of the plurality of PUCCH resources overlaps with an uplink transmission in the time domain. The UE generates one or more code bits (called the first information) and transmits the uplink transmission carrying the generated code bits additionally. In some embodiments, the UE does not transmit the plurality of PUCCHs. The first information is generated in accordance with the scheme in some embodiments (e.g., embodiments disclosed in Group 2, as discussed herein), taking account into all the PUCCH resources that overlaps in the time domain including the sixth PUCCH resource. In some embodiments, the uplink transmission is used for unicast transmission.

Figure 7:
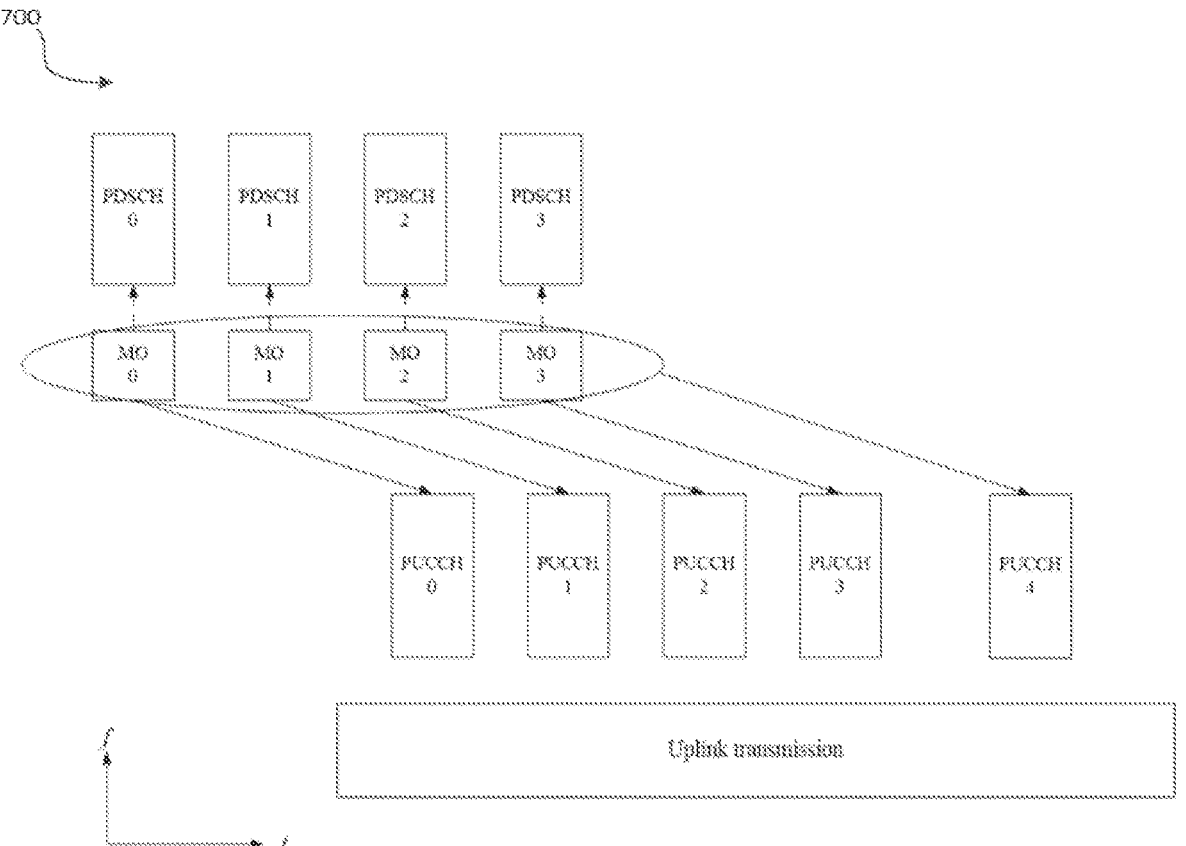
FIG. 7 illustrates an example diagram of overlapping of PUCCHs and an uplink transmission, in accordance with some embodiments of the present disclosure.

FIG. 7 illustrates an example diagram of overlapping of PUCCHs and an uplink transmission, in accordance with some embodiments of the present disclosure. There are totally 5 PUCCH resources denoted by PUCCH 0~4, respectively overlapping with a fourth uplink transmission. 4 PUCCH resources (PUCCH 0~3) correspond to 4 PDCCH monitoring occasions (denoted by MO 0~3, respectively). PUCCH 0 corresponds to MO 0, PUCCH 1 corresponds to MO 1, and so on. PDCCHs transmitted on MO 0~3 schedule PDSCH 0~3, respectively. In some embodiments, if a UE does not correctly decode a transport block scheduled by MO 0 (i.e. transport block carried on PDSCH 0), the UE will transmit PUCCH 0. In some embodiments, if a UE correctly decodes a transport block scheduled by MO 0 (i.e. transport block carried on PDSCH 0), the UE will not transmit PUCCH 0. PUCCH 4 corresponds to MO 0~3. In some embodiments, if a UE does not successfully detect any DCI (PDCCH) transmitted on MO 0~3 for the UE, the UE will transmit PUCCH 4. In some embodiments, if a UE successfully detects at least one DCI (PDCCH) transmitted on MO 0~3 for the UE, the UE will not transmit the PUCCH 4.

Since there exists overlapping between PUCCH and the uplink transmission, the UE generates the first information and does not transmit any of PUCCH 0~4. In some embodiments, since the number of PUCCH resources overlapping with the fourth uplink transmission is 5, the length of first information bits is 3. In some embodiments, if a UE would not transmit any of the 5 PUCCHs, a first information bits value of '000' is generated. If a UE would transmit PUCCH 0, a first information bits value of '001' is generated. In some embodiments, if a UE would transmit PUCCH 1, a first information bits value of '010' is generated. In some embodiments, if a UE would transmit PUCCH 2, a first information bits value of '011' is generated. If a UE would transmit PUCCH 3, a first information bits value of '100' is generated. In some embodiments, if a UE would transmit PUCCH 4, a first information bits value of '101' is generated. The first information bits will be carried by the fourth uplink transmission and UE will transmit the fourth uplink transmission. In some embodiments, since the number of PUCCH resources overlapping with the fourth uplink transmission is 5, the length of first information bits is 5. In some embodiments, if a UE would transmit PUCCH 0, a first information bits value of '10000' is generated. In some embodiments, if a UE would transmit PUCCH 1, a first information bits value of '01000' is generated. In some embodiments, if a UE would transmit PUCCH 2, a first information bits value of '00100' is generated. In some embodiments, if a UE would transmit PUCCH 3, a first information bits value of '00010' is generated. In some embodiments, if a UE would transmit PUCCH 4, a first information bits value of '00001' is generated. In some embodiments, if a UE would transmit PUCCH 0 and PUCCH 1, a first information bits value of '11000' is generated.

In some embodiments, a seventh PUCCH resource is configured by the network for the UE. The seventh PUCCH resource corresponds to a MBS session. For the MBS session, if the UE does not correctly decode a transport block carried on a PDSCH, the UE transmits the seventh PUCCH. For the MBS session, if the UE correctly decodes a transport block carried on a PDSCH, the UE does not transmit the seventh PUCCH.

In some embodiments, an eighth PUCCH resource is configured by the network for the UE. If the UE would transmit the sixth PUCCH and the seventh PUCCH and there exists overlapping in the time domain between the sixth PUCCH and the seventh PUCCH or the sixth PUCCH and the seventh PUCCH would be transmitted on the same slot or sub-slot, the UE only transmits the eight PUCCH. In some embodiments, the eight PUCCH have the same time domain resource with the seventh PUCCH or the sixth PUCCH. In some embodiments, the eight PUCCH and the sixth PUCCH or the seventh PUCCH are on the same slot or sub-slot. The generated first information are carried by the uplink transmission.

In some embodiments, there are more than one MBS session for a UE to receive. It is configured that a MBS session can be transmitted on one or more cells. The UE receives PDCCH and/or PDSCH for the MBS session only on these cells. That is to say, one MBS session corresponds to one or more cell. The UE receives PDCCH and/or PDSCH of a MBS session in the corresponding cell. For example, there are two cells configured for a UE, denoted by cell 0 and cell 1. It is configured that the UE receives three MBS services, denoted by MBS 1, MBS 2, and MBS 3. It is configured that MBS 2 is only transmitted on cell 0 and MBS 1 and MBS 3 are transmitted on cell 1. Therefore, the UE monitors (e.g., detects, receives) PDCCH and/or PDSCH for MBS 2 on cell 0 and monitors (e.g., detects, receives) PDCCH and/or PDSCH for MBS 1 and MBS 3 on cell 1.

In some embodiments, determining by a wireless device, a downlink control information (DCI) format schedules transmission on a plurality of frequency bandwidths. In some embodiments, determining by the wireless device, the number of the information bits of the DCI format are different in response to scheduled transmission on different frequency bandwidth. In some embodiments, aligning by the wireless device, the size of the DCI format. In some embodiments, the DCI format schedules transmission for a plurality of services on the plurality of frequency bandwidths. In some embodiments, the plurality of services include at least unicast service and multicast service. In some embodiments, multicast service includes one or more MBS sessions. In some embodiments, a service corresponds to a frequency bandwidth, wherein the DCI format schedules the transmission for the service that is transmitted on the corresponding frequency bandwidth. In some embodiments, aligning the size of the DCI format comprises appending zero bits to the smaller DCI format until the payload size equals that of the larger DCI format. In some embodiments, aligning the size of the DCI format comprises truncating the first few most significant bits of the frequency domain resource allocation (FDRA) field in the larger DCI format such that the payload size of the DCI format are the same.

In some embodiments, there are a plurality of frequency ranges (e.g., frequency bandwidth) configured for a UE for frequency domain resource allocation. The plurality of frequency ranges have different or the same size (e.g., the number of RB or RE). The size of frequency domain resource allocation (FDRA) field in a DCI format is based on the frequency range (e.g. the size of the frequency domain). A DCI format schedules PDSCH or PUSCH that is transmitted on different frequency ranges. The size of DCI format for schedules PDSCH or PUSCH transmitted on different frequency ranges may be different based on the different size of frequency ranges. That is to say, the DCI format has a different size. A first DCI format schedules PDSCH or PUSCH transmitted on the first frequency range. A second DCI format schedules PDSCH or PUSCH transmitted on the second frequency range. The first DCI format and the second DCI format can be the same DCI format. If the number of information bits in the first DCI format (e.g. the size of the first DCI format) is not equal to the number of information bits in the second DCI format, a number of zero padding bits are generated for (e.g. appended to, or concatenated to) the smaller DCI format until the payload size equals that of the larger DCI format. If the number of information bits in the first DCI format is less than the payload size of the second DCI format, a number of zeros padding bits are generated for the first DCI format until the payload size equals that of the second DCI format. If the number of information bits in the first DCI format is larger than the payload size of the second DCI format, the bandwidth of the FDRA field in the first DCI format is reduced by truncating the first few most significant bits such that the size of the first DCI format equals the size of the second DCI format. After appending or truncating, the DCI format has one size.

One of the plurality of frequency ranges is used for unicast service. One of the plurality of frequency ranges is used for a plurality of multicast services. That is to say, one of the plurality of frequency ranges corresponds to a service. The plurality of frequency ranges have different or the same size (e.g., the number of RB or RE). A DCI format can schedule PDSCH/PUSCH for unicast service and schedules PDSCH/PUSCH for multicast service. The size of frequency domain resource allocation (FDRA) field in a DCI format is based on the frequency range (e.g. the size of the frequency domain). When a DCI format schedules a PDSCH/PUSCH for a service, the PUSCH or PUSCH is transmitted on the corresponding frequency range and the size of FDAI field in the DCI format is based on the size of corresponding frequency range. The size of FDRA field in DCI format may be different based on different frequency range when the DCI format schedules different service. This lead to the size of DCI format may be different. If the number of information bits in DCI format for scheduling a first service is not equal to the number of information bits in DCI format for scheduling a second service, a number of zero padding bits are generated for (e.g. appended to, or concatenated to) the smaller DCI format until the payload size equals that of the larger DCI format. If the number of information bits in the DCI format for scheduling a first service is less than the payload size of the DCI format for scheduling a second service, a number of zeros padding bits are generated for the DCI format for scheduling a first service until the payload size equals that of the DCI format for scheduling a second service. If the number of information bits in the DCI format for scheduling a first service is larger than the payload size of the DCI format for scheduling a second service, the bitwidth of the FDRA field in the DCI format for scheduling a first service is reduced by truncating the first few most significant bits such that the size of DCI format for scheduling a first service equals the size of the DCI format for scheduling a second service. In some embodiments, the DCI format for scheduling unicast service is scrambled by a first RNTI (e.g., C-RNTI). The DCI format for scheduling multicast service is scrambled by a second RNTI (e.g. G-RNTI). Different multicast service have the different RNTI. In some embodiments, there is a field in the DCI format for indicating service (e.g., unicast, multicast, MBS index) that the DCI format schedules. After appending or truncating, the DCI format has one size regardless of the service that the DCI format schedules.

For example, there are two frequency bandwidths, bandwidth 0 and bandwidth 1. Bandwidth 0 is used for PDSCH/PUSCH transmission for multicast service. Bandwidth 1 is used for PDSCH/PUSCH transmission for unicast service. The DCI format scrambled by a G-RNTI schedules PDSCH/PUSCH for multicast service. Based on bandwidth 0, the number of information bits in DCI format scrambled by G-RNTI is Y (Y>0). Based on bandwidth 1, the number of bits in DCI format scrambled by C-RNTI is Z (Z>0). If it is assumed that Y<Z, (Z−Y) padding bits shall be appended to the information bits of the DCI format DCI format scrambled by G-RNTI. In some embodiments, Z−Y bits are truncated for the most significant bits of the FDRA field in DCI format scrambled by C-RNTI. In some embodiments, bandwidth 0 is used for a first multicast service and bandwidth 1 is used for a second multicast service. The same operation is performed to align the DCI format size.

6. Methods for Implementing Exemplary Embodiments from Groups 1-4

FIG. 8 is a flow diagram depicting a method for multiplexing one or more uplink messages, in accordance with some embodiments of the present disclosure. Additional, fewer, or different operations may be performed in the method depending on the particular embodiment. In some embodiments, some or all operations of method 800 may be performed by a wireless communication node, such as BS 102 in FIG. 1. In some operations, some or all operations of method 800 may be performed by a wireless communication device, such as UE 104 in FIG. 1. Each operation may be re-ordered, added, removed, or repeated.

As shown, the method 800 includes, in some embodiments, the operation 802 of receiving, by a wireless communication device, a transport block of a multicast and broadcast service (MBS) session on a physical downlink shared channel (PDSCH). The method includes, in some embodiments, the operation 804 of determining, by the wireless communication device, an overlap in a time domain of a PUCCH corresponding to the PDSCH and an uplink channel. The method includes, in some embodiments, the operation 806 of transmitting, by the wireless communication device responsive to determining the overlap, another PUCCH.

FIG. 9 is a flow diagram depicting a method for multiplexing one or more uplink messages, in accordance with some embodiments of the present disclosure. Additional, fewer, or different operations may be performed in the method depending on the particular embodiment. In some embodiments, some or all operations of method 900 may be performed by a wireless communication node, such as BS 102 in FIG. 1. In some operations, some or all operations of method 900 may be performed by a wireless communication device, such as UE 104 in FIG. 1. Each operation may be re-ordered, added, removed, or repeated.

As shown, the method 900 includes, in some embodiments, the operation 902 of receiving, by a wireless communication device, one or more transport blocks of one or more multicast and broadcast service (MBS) sessions on one or more physical downlink shared channels (PDSCH). The method includes, in some embodiments, the operation 904 of determining, by the wireless communication device, a first overlap in a time domain of one or more first PUCCH and a second uplink channel. The method includes, in some embodiments, the operation 906 of generating, by the wireless communication device responsive to determining the first overlap, a first information. The method includes, in some embodiments, the operation 908 of transmitting, by the wireless communication device, the first information on the second uplink channel.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program (e.g., a computer program product) or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method comprising:

receiving, by a wireless communication device, one or more transport blocks of a multicast and broadcast service (MBS) session on at least one physical downlink shared channels (PDSCHs);

determining, by the wireless communication device, decoding results of the one or more transport blocks;

according to determining a first decoding result comprising a failure to correctly decode at least one of the one or more transport blocks:

selecting, by the wireless communication device, a physical uplink control channel PUCCH) resource of a plurality of PUCCH resources, wherein the PUCCH resource corresponds to the first decoding result of the at least one transport block and the PUCCH resource is selected based on a correspondence between the PUCCH resource and the first decoding result of the at least one transport block; and transmitting, by the wireless communication device a PUCCH signaling on the PUCCH resource;

and according to determining a second decoding result comprising successful decoding of each of the one or more transport blocks, foregoing transmission of any PUCCH signaling according to the second decoding result.

2. The method of claim 1, wherein each of the plurality of PUCCH resources corresponds to a respective decoding result of one or a combination of two or more transport blocks.

3. The method of claim 2, wherein the PUCCH signaling is transmitted on the PUCCH resource, responsive to determining the failure to correctly decode the at least one transport block.

4. The method of claim 1, wherein at least two PUCCH resources, of the plurality of PUCCH resources, have a same time domain resource.

5. The method of claim 1, further comprising:

determining, by the wireless communication device, the failure to correctly decode the at least one transport block of the MBS session, wherein the wireless communication device transmits the PUCCH signaling on the PUCCH resource responsive to determining the failure to correctly decode the at least one transport block of the MBS session.

6. The method of claim 1, wherein the transport block of the MBS session corresponds to a parameter comprising a radio network temporary identifier (RNTI).

7. A method comprising:

transmitting, by a wireless communication node to a wireless communication device, one or more transport blocks of a multicast and broadcast service (MBS) session on at least one physical downlink shared channel (PDSCH); and determining, by the wireless communication node, decoding results of the one or more transport blocks by the wireless communication device, wherein determining the decoding results comprises:

according to a failure to correctly decode at least one of the one or more transport blocks by the wireless communication device:

receiving, by the wireless communication node from the wireless communication device, according to a first decoding result by the wireless communication device a physical uplink control channel (PUCCH) signaling on a PUCCH resource of a plurality of PUCCH resources, the first decoding result comprising a failure to correctly decode the at least one transport block, wherein the PUCCH resource corresponds to the first decoding result and the PUCCH resource is selected by the wireless communication device based on a correspondence between the PUCCH resource and the first decoding result;

determining, by the wireless communication node, the failure to correctly decode the at least one transport block according to the PUCCH resource on which the PUCCH signaling is received; and according to successful decoding of each of the one or more transport blocks by the wireless communication device:

determining, by the wireless communication node, successful decoding of each of the one or more transport blocks according to an absence of PUCCH signaling by the wireless communication device.

8. The method of claim 7, wherein each of the plurality of PUCCH resources corresponds to a respective decoding result of a combination of two or more transport blocks.

9. The method of claim 8, wherein the PUCCH signaling is received on the PUCCH resource, responsive to the wireless communication device determining the failure to correctly decode the at least one transport block of the MBS session.

10. The method of claim 7, wherein at least two PUCCH resources, of the plurality of PUCCH resources, have a same time domain resource.

11. The method of claim 7, wherein the wireless communication device transmits the PUCCH signaling on the PUCCH resource responsive to determining the failure to correctly decode the at least one transport block of the MBS session.

12. The method of claim 7, wherein the transport block of the MBS session corresponds to a parameter comprising a radio network temporary identifier (RNTI).

13. A wireless communication device comprising:

at least one processor configured to:

receive, via a receiver, one or more transport blocks of a multicast and broadcast service (MBS) session on at least one physical downlink shared channel (PDSCH);

determine decoding results of the one or more transport blocks;

according to determining a first decoding result comprising a failure to correctly decode at least one of the one or more transport blocks:

select a physical uplink control channel (PUCCH) resource of a plurality of PUCCH resources, wherein the PUCCH resource corresponds to the first decoding result of the at least one transport block and the PUCCH resource is selected based on a correspondence between the PUCCH resource and the first decoding result of the at least one transport block;

transmit, via a transmitter, a PUCCH signaling on the PUCCH resource; and according to determining a second decoding result comprising successful decoding of each of the one or more transport blocks, foregoing transmission of any PUCCH signaling according to the second decoding result.

14. The wireless communication device of claim 13, wherein each of the plurality of PUCCH resources corresponds to a respective decoding result of a combination of two or more transport blocks.

15. The wireless communication device of claim 14, wherein the PUCCH signaling is transmitted on the PUCCH resource, responsive to determining the failure to correctly decode the at least one transport block of the MBS session.

16. The wireless communication device of claim 13, wherein at least two PUCCH resources, of the plurality of PUCCH resources, have a same time domain resource.

17. The wireless communication device of claim 13, wherein the at least one processor is configured to:

determine the failure to correctly decode the at least one transport block of the MBS session, wherein the wireless communication device transmits the PUCCH signaling on the PUCCH resource responsive to determining the failure to correctly decode the transport block of the MBS session.

18. The wireless communication device of claim 13, wherein the transport block of the MBS session corresponds to a parameter comprising a radio network temporary identifier (RNTI).

19. A wireless communication node comprising:

at least one processor configured to:

transmit, via a transmitter to a wireless communication device, one or more transport blocks of a multicast and broadcast service (MBS) session on at least one physical downlink shared channel (PDSCH); and determine decoding results of the one or more transport blocks by the wireless communication device, wherein, to determine the decoding results, the at least one processor is configured to:

according to a failure to correctly decode at least one of the one or more transport blocks by the wireless communication device:

receive, via a receiver from the wireless communication device, according to a first decoding result by the wireless communication device a physical uplink control channel (PUCCH) signaling on a PUCCH resource of a plurality of PUCCH resources, the first decoding result comprising a failure to correctly decode the at least one transport block, wherein the PUCCH resource corresponds to the first decoding result of the at least one transport block and the PUCCH resource is selected by the wireless communication device based on a correspondence between the PUCCH resource and the first decoding result; and determine the failure to correctly decode the at least one transport block according to the PUCCH resource on which the PUCCH signaling is received; and according to successful decoding of each of the one or more transport blocks by the wireless communication device:

determine successful decoding of each of the one or more transport blocks according to an absence of PUCCH signaling by the wireless communication device.

\* \* \* \* \*